United States Patent [19]

Tachikawa et al.

[11] Patent Number: 4,849,483
[45] Date of Patent: * Jul. 18, 1989

[54] PROCESS FOR PRODUCING A CATALYST COMPONENT FOR POLYMERIZATION OF OLEFINS

[75] Inventors: Mamoru Tachikawa; Masato Sakuma; Satoshi Ueki, all of Saitama; Chihiro Imai, Kanagawa; Tokuo Makishima, Saitama, all of Japan

[73] Assignee: Toa Nenryo Kogyo K.K., Tokyo, Japan

[*] Notice: The portion of the term of this patent subsequent to Jun. 17, 2003 has been disclaimed.

[21] Appl. No.: 39,496

[22] Filed: Apr. 16, 1987

Related U.S. Application Data

[62] Division of Ser. No. 802,660, Nov. 27, 1985, Pat. No. 4,686,199.

[30] Foreign Application Priority Data

Nov. 30, 1984 [JP]   Japan ................................ 59-251741

[51] Int. Cl.$^4$ ................................................ C08F 4/64

[52] U.S. Cl. ..................................... 526/97; 526/121; 526/122; 526/124; 526/348.6; 526/352

[58] Field of Search ................ 526/97, 124, 125, 129; 502/121, 122

[56] References Cited

U.S. PATENT DOCUMENTS

| | | | |
|---|---|---|---|
| 4,451,574 | 5/1984 | Johnson | 526/129 X |
| 4,565,796 | 1/1986 | Etherton | 526/127 X |
| 4,595,735 | 6/1986 | Nomura et al. | 526/125 |
| 4,625,003 | 11/1986 | Imai et al. | 526/124 X |
| 4,686,265 | 8/1987 | Maruyama et al. | 526/125 |

Primary Examiner—Patrick P. Garvin
Attorney, Agent, or Firm—M. B. Kurtzman; J. F. Hunt

[57] ABSTRACT

A process for producing a catalyst component for polymerization of olefins which comprises contacting (a) a metal oxide with (b) a magnesium alkoxide, contacting the resulting contact product with (c) a halogen-containing compound, and finally contacting the resulting contact product with (d) a titanium compound.

5 Claims, No Drawings

PROCESS FOR PRODUCING A CATALYST COMPONENT FOR POLYMERIZATION OF OLEFINS

This is a division of application Ser. No. 802,660, filed 11/27/85 and now U.S. Pat. No. 4,686,199.

DETAILED DESCRIPTION OF THE INVENTION:

Field of Industrial Application

The present invention relates to a process for producing a catalyst component for polymerization of olefins.

Prior Art

In order to improve the catalytic activity per unit weight of catalyst component of Ziegler-Natta catalyst which is effective for the polymerization of olefins, or in order to reduce the amount of residues in the polymer resulting from the catalyst, there are several known catalyst components prepared by supporting a transition metal on a variety of carriers.

Some attempts have been made to prepare a catalyst component for polymerization of olefins by contacting an organomagnesium compound with an inorganic carrier such as silica and alumina and then contacting the resulting contact product with a titanium halide. The catalyst component thus prepared has an obvious disadvantage in that it has a low catalytic activity and provides polymers having a low bulk density.

Recently there has been proposed in Japanese Patent Laid-open No. 162607/1983 a process for polymerizing an alpha-olefin with a solid catalyst component prepared by contacting a metal oxide such as silica and alumina with a magnesium dihydrocarbyloxide and then contacting the resulting contact product with an electron donor compound and a titanium halide compound. The catalyst component used in this process exhibits considerably high catalytic activity in the (co)polymerization of an alpha-olefin such as propylene, however it does not have the satisfactory catalytic activity for the (co) polymerization of ethylene.

Problems to be Solved by the Invention

It is an object of the present invention to provide a solid catalyst component which is capable of producing olefin polymers of high bulk density and exhibits a high catalytic activity when used for the (co) polymerization of olefins, particularly ethylene.

Means to Solve the Problem

Summary of the Invention

The present inventors carried out a series of researches which led to the findings that the object of the invention is achieved by the catalyst component produced by contacting a metal oxide, magnesium dihydrocarbyloxide, halogen-containing compound, and titanium compound with one another consecutively.

Accordingly, the gist of the invention resides in a process for producing a catalyst component for polymerization of olefins which comprises contacting (a) a metal oxide with (b) a magnesium dihydrocarbyloxide, contacting the resulting contact product with (c) a halogen-containing compound, and finally contacting the resulting contact product with (d) a titanium compound.

Raw Materials for Catalyst Component

(A) Metal Oxide

The metal oxide used in this invention is an oxide of an element selected from Groups II to Groups IV of the Periodic Table. It includes, for example, $B_2O_3$, MgO, $Al_2O_3$, $SiO_2$, CaO, $TiO_2$, ZnO, $ZrO_2$, $SnO_2$, BaO, and $ThO_2$. Preferable among them are $B_2O_3$, MgO, $Al_2O_3$, $SiO_2$, $TiO_2$, and $ZrO_2$. Particularly preferable is $SiO_2$. A complex oxide containing them can also be used. It includes, for example, $SiO_2$-MgO, $SiO_2$-$Al_2O_3$, $SiO_2$-$TiO_2$, $SiO_2$-$V_2O_5$, $SiO_2$-$Cr_2O_3$, and $SiO_2$-$TiO_2$-MgO.

The above-mentioned metal oxides and complex oxides should preferable be anhydrous; however, the inclusion of a trace amount of hydroxide which is normally present may be permissible. In addition, the inclusion of impurities may be permissible if the amount is not so large as to impair the properties of the metal oxide to a great extent. The permissible impurities include oxides, carbonates, sulfates, and nitrates such as sodium oxide, potassium oxide, lithium oxide, sodium carbonate, potassium carbonate, calcium carbonate, magnesium carbonate, sodium sulfate, aluminum sulfate, barium sulfate, potassium nitrate, magnesium nitrate, and aluminum nitrate.

Usually the metal oxide is used in the form of powder. The size and shape of the powder particles affect the resulting olefin polymer in many cases. They should preferably be controlled as desired. Prior to use, the metal oxide should be calcined at as high a temperature as possible in order to remove any catalyst poison, and the calcined metal oxide should preferably be handled in isolation from the air.

(B) Magnesium Alkoxide

The magnesium dihydrocarbyloxide used in this invention is one which is represented by the formula Mg(OR)(OR'), where R and R' are $C_1$ to $C_{20}$, preferably $C_1$ to $C_{10}$ alkyl, alkenyl, cycloalkyl, aryl, or aralkyl groups, and R and R' may be the same or different.

Any magnesium dihydrocarbyloxide represented by the above-formula may be used; but preferably they should be soluble at normal temperature in an inert solvent which is used at the time of contacting with a metal oxide.

Where the inert solvent is a hydrocarbon or halogenated hydrocarbon, the magnesium dihydrocarbyloxide soluble in the solvent is one in which R and R' defined in the above-formula are alkyl groups or cycloalkyl groups, particularly alkyl groups of carbon number 7 and up which may have side chains.

Examples of such compounds include magnesium di-2-ethylhexyloxide, magnesium di-2-methylhexyloxide, magnesium di-2-ethylheptyloxide, magnesium di-2-methylheptyloxide, magnesium di-2-ethylpentyloxide, magnesium di-2-(methylethyl)pentyloxide, magnesium di-1-methylhexyloxide, magnesium di-1-ethylpentyloxide, magnesium di-1-propylbutoxide, magnesium di-1-methylheptyloxide, magnesium di-1-ethylhexyloxide, magnesium di-1-propylpentyloxide, magnesium di-1-dimethylpentyloxide, magnesium di-1-dimethylhexyloxide, magnesium di-1-dimethylheptiyloxide, magnesium di-1-dimethyloctyloxide, magnesium di-1-dimethylnonyloxide, magnesium di-1-methyethylbutoxide, magnesium di-1-(methylethyl)pentyloxide, magnesium di-1-(methylethyl)hexyloxide, magnesium di-1-(methylethyl)heptyloxide, magnesium di-1-(methylethyl- )octyloxide, magnesium di-1-diethylpropoxide, magnesium di-1-diethylpentyloxide, magnesium di-1-diethylhexyloxide, magnesium di-1-diethylheptyloxide, magnesium di-1-diethyloctyloxide, magnesium di-1-(ethylbutyl)pentyloxide, magnesium di-1-dibutylpentyloxide, magnesium di-1-methylcyclohexyloxide, magnesium di-2-methylcyclohexyloxide, magnesium di-3-methylcyclohexyloxide, and magnesium di-4-methylcyclohexyloxide. Preferable among them are magnesium di-2-ethylhexyloxide, magnesium di-1-methylhexyloxide, magnesium di-1-ethylpentyloxide, magnesium di-1-methylhexyloxide, and magnesium di-1-ethylhexyloxide.

Where an alcohol is used as a solvent, the following compounds may also be used. $Mg(OCH_3)_2$, $Mg(OC_2H_5)_2$, $Mg(OCH_3)(OC_2H_5)$, $Mg(Oi\text{-}C_3H_7)_2$, $Mg(OC_3H_7)_2$, $Mg(OH_4H_9)_2$, $Mg(OC_4H_9)(Oi\text{-}C_4H_9)$, $Mg(OC_4H_9)(Osec\text{-}C_4H_9)$, $Mg(OC_6H_{13})_2$, $Mg(OC_6H_{11})_2$, and $Mg(OC_6H_5)_2$.

The magnesium dihydrocarbyloxide should preferably be dried before use, and more preferably be dried with heating under reduced pressure. Any commercially available one may be used as such, or a desired compound may be synthesized according to the known method.

(C) Halogen-Containing Compound

The halogen-containing compound includes halides of metallic or non-metallic elements such as $SiCl_4$, $SnCl_4$, $AlCl_3$, $BCl_3$, $SbCl_3$, $BI_3$, $PCl_3$, and $PCl_5$; hydrogen halides such as HCl, HBr, and HI; oxyhalides of non-metallic elements such as $SO_2Cl_2$, $SOCl_2$, $NOCl$, and $POCl_3$; and halogenated hydrocarbons such as carbon tetrachloride, 1,2-dichloroethane, 1,1,2-trichloroethylene, hexachloroethane, 1,2-dichloropropane, octachloropropane, hexachlorocyclohexane, dichlorobenzene, and hexachlorobenzene. Preferable are silicon compounds having the hydrogensilicon bond represented by the formula $H_mR_nSiX_r$ and especially hydrochlorosilanes. Halogen elements such as chlorine, bromine, fluorine, and iodine can also be used.

In the above formula, R is (1) a hydrocarbyl group, (2) $R^1O$(where $R^1$ is a hydrocarbyl group), (3) $R^2R^3N$(where $R^2$ and $R^3$ are hydrocarbyl groups), or (4) $R^4COO$(where $R^4$ is a hydrogen atom or hydrocarbyl group); X is a halogen atom; m is a numeral of 1 to 3; $0 < r < 4$; and $m+n+r=4$. (Where n is 2 or above, two or more of R may be the same or different).

The hydrocarbon groups represented by R, $R^1$, $R^2$, $R^3$, and $R^4$ include $C_1$–$C_{16}$ alkyl, alkenyl, cycloalkyl, aryl, and aralkyl groups. The alkyl groups include methyl, ethyl, propyl, n-butyl, isobutyl, n-hexyl, n-octyl, 2-ethylhexyl, and n-decyl groups. The alkenyl groups include vinyl, allyl, isopropenyl, propenyl, and butenyl groups. The cycloalkyl groups include cyclopentyl and cyclohexyl groups. The aryl groups include phenyl, tolyl, and xylyl groups. The aralkyl groups include benzyl, phenethyl, and phenylpropyl groups.

Preferable among them are lower alkyl groups such as methyl, ethyl, propyl, isopropyl, n-butyl, isobutyl, and t-butyl groups; and aryl groups such as phenyl and tolyl groups.

X in the above formula is a halogen atom such as chlorine, bromine, and iodine; and it is preferably a chlorine atom.

Examples of the silicon compound include $HSiCl_3$, $H_2SiCl_2$, $H_3SiCl$, $HCH_3SiCl_2$, $HC_2H_5SiCl_2$, $H(t\text{-}HC_6H_5SiCl_2$, $H(CH_3)_2SiCl$, $H(i\text{-}C_3H_7)_2SiCl$, $H_2C_2H_5SiCl$, $H_2(n\text{-}C_4H_9)SiCl$, $HSiCl$ $(C_6H_5)_2$, and $H_2(C_6H_4CH_3)SiCl$. Preferable among them are $HSiCl_3$, $H_2SiCl_2$, $HCH_3SiCl_2$, $H(CH_3)_2SiCl$.

(D) Titanium Compound

The titanium compound used in this invention is a compound of divalent, trivalent, or tetravalent titanium. Examples of the compound include titanium tetrachloride, titanium tetrabromide, trichloroethoxytitanium, trichlorobutoxytitanium, dichlorodiethyoxytitanium, dichlorodibutoxytitanium, dichlorodiphenoxytitanium, chlorotriethoxytitanium, chlorotributoxytitanium, tetrabutoxytitanium, and titanium trichloride. Preferable among them are the titanium compounds represented by the formula $TiX_p(OR)_{4-p}$ wherein $O$ $p$ 4, X is a halogen such as for example, chlorine, bromine, and iodine and R is an alkyl or aryl group having from 1 to 10 carbon atoms, for example alkyl groups such as methyl, ethyl, propyl, butyl, sec-butyl, pentyl, and aryl groups such as phenyl. Most preferable are the tetravalent titanium halides such as titanium tetrachloride, trichloroethoxytitanium, dichlorodibutoxytitanium, and dichlorodiphenoxytitanium. Particularly preferable is titanium tetrachloride.

Preparation of Catalyst Component

According to this invention, the catalyst component is prepared by contacting a metal oxide (constituent A) with a magnesium dihydrocarbyloxide (constituent B), and contacting the resulting contact product with a halogen-containing compound (constituent C), and further contacting the resulting contact product with a titanium compound (constituent D).

(1) Contacting Constituent A With Constituent B

The contacting of constituent A with constituent B may be accomplished by bringing them into direct contact with each other. The contacting should preferably be performed by mixing and stirring them in the presence of an inert solvent which dissolves constituent B.

The inert solvent includes, for example, hydrocarbons such as pentane, hexane, heptane, octane, decane, cyclohexane, benzene, toluene, xylene, and ethylbenzene; halogenated hydrocarbons such as carbon tetrachloride, dichloroethane, trichloroethane, trichloropropane, dichlorobutane, dichloropentane, dichlorohexane, dichlorooctane, and chlorobenzene; and alcohols such as methanol, ethanol, propanol, isopropanol, butanol, isobutanol, hexanol, 2-ethylhexanol, octanol, and decanol.

Usually the contacting of constituent A with constituent B is performed at 0° to 150° C. for 0.1 to 50 hours. One mol of constituent A is brought into contact with 0.01 to 10 mol, preferably 0.1 to 5 mol of constituent B. Usually the inert solvent is used in an amount of 1 to 10 cc for 1 g of constituent A.

The contacting of constituent A with constituent B may be performed more than once, if necessary. In such a case, the excess of constituent B and inert solvent used in the preceding contacting is removed and, if necessary, the contact product is dried, and fresh constituent B and inert solvent are added to perform the second contacting.

The solid contact product (referred to as product I hereinafter) obtained as mentioned above is then used for the subsequent contacting. If necessary, it may be washed with one of the above-mentioned inert solvents and dried prior to the subsequent contacting.

(2) Contacting With Constituent C

The contacting of product I with constituent C is accomplished by mechanically copulverizing or mixing and stirring them in the presence or absence of an inert solvent. The preferred procedure is to mix and stir them in an inert solvent.

The inert solvent is a hydrocarbon such as hexane, heptane, octane, cyclohexane, benzene, toluene, xylene, and ethylbenzene, or one of the above-mentioned halogenated hydrocarbons used as constituent C.

Where the contacting of constituent A with constituent B is performed in the presence of a solvent of halogenated hydrocarbon, constituent C should preferably be a halogenated hydrocarbon which is different from the one used as the solvent.

Usually the contacting of product I with constituent C is performed at 0° to 150° C. for 0.1 to 20 hours, preferably at 50° to 100° C. The amount of constituent C used for the contacting is 0.1 to 20 gram-mol, preferably 0.5 to 5 gram-mol, for 1 gram-atom of magnesium in product I.

The solid product obtained by this contacting procedure is designated as product II. It is subsequently brought into contact with a titanium compound (constituent D). Prior to the subsequent contacting, it may be washed with an inert solvent and dried.

(3) Contacting With Constituent D

The contacting of product II with constituent D is accomplished by mechanically copulverizing them or mixing and stirring them in the presence or absence of an inert solvent such as the above-mentioned hydrocarbon. The preferred procedure is to mix and stir them in the presence of an inert solvent.

In the contacting procedure, constituent D is used in an amount greater than 0.01 gram-mol, preferably 0.1 to 10 gram-mol, for 1 gram-atom of magnesium in product II. The contacting is accomplished at 0° to 200° C. for 0.5 to 20 hours, preferably at 60° to 150° C. for 1 to 5 hours.

The contacting of product II with constituent D may be accomplished twice or more in the same procedure as mentioned above. The contact product obtained by the first contacting may be washed with an inert solvent, if necessary, prior to the second contacting.

In the way mentioned above, the catalyst component of this invention can be produced. If necessary, it may be washed with an inert hydrocarbon such as hexane, heptane, octane, cyclohexane, benzene, toluene, and xylene, and the washed one may be dried.

The catalyst component obtained according to the process of this invention is composed of 20 to 45 wt% of metal atoms derived from constituent A, 0.5 to 10 wt% of magnesium atoms, 0.1 to 5 wt% of titanium atoms, and 4 to 40 wt% of halogen atoms. It has a narrow particle size distribution and a uniform particle size.

Catalyst for Polymerization of Olefins

The catalyst component of this invention is combined with an organic compound of metals of Groups I to III of the Periodic Table to be made into a catalyst for homopolymerization of an olefin or for copolymerization of an olefin with another olefin.

Organic Compounds of Metals of Groups I to III

The organometallic compound for this purpose includes organic compounds of lithium, magnesium, calcium, zinc, and aluminum. Preferable among them are organoaluminum compounds which are represented by the formula $R_nAlX_{3-n}$ (where R is an alkyl group or aryl group; X is a halogen atom, alkoxy group, or hydrogen atom; and n is a number in the range of $1 \leq n \leq 3$). Preferred examples include $C_1$ to $C_{18}$, more suitably $C_2$ to $C_6$ alkyl aluminum compounds and mixtures thereof and complex compounds thereof such as trialkyl aluminum, dialkyl aluminum monohalide, monoalkyl aluminum dihalide, alkyl aluminum sesquihalide, dialkyl aluminum monoalkoxide, and dialkyl aluminum monohydride. Their examples include trialkyl aluminum such as trimethyl aluminum, triethyl aluminum, tripropyl aluminum, triisobutyl aluminum, and trihexyl aluminum., dialkyl aluminum monohalide such as dimethyl aluminum chloride, diethyl aluminum chloride, diethyl aluminum bromide, diethyl aluminum iodide, and diisobutyl aluminum chloride; monoalkyl aluminum dihalide such as methyl aluminum dichloride, ethyl aluminum dichloride, methyl aluminum dibromide, ethyl aluminum dibromide, ethyl diiodide, and isobutyl aluminum dichloride; alkyl aluminum sesquihalide such as ethyl aluminum sesquichloride; dialkyl aluminum monoalkoxide such as dimethyl aluminum methoxide, diethyl aluminum ethoxide, diethyl aluminum phenoxide, dipropyl aluminum ethoxide, diisobutyl aluminum ethoxide, and diisobutyl aluminum phenoxide; and dialkyl aluminum hydride such as dimethyl aluminum hydride, diethyl aluminum hydride, dipropyl aluminum hydride, and diisobutyl aluminum hydride.

Preferable among these compounds is trialkyl aluminum, particularly triethyl aluminum and triisobutyl aluminum. The trialkyl aluminum may be used in combination with other organoaluminum compounds such as commercially available diethyl aluminum chloride, ethyl aluminum dichloride, ethyl aluminum sesquichloride, diethyl aluminum ethoxide, and diethyl aluminum hydride, or a mixture thereof or a complex compound thereof.

It is also possible to use an organoaluminum compound in which two or more aluminum atoms are connected through an oxygen atom or nitrogen atom. Examples of such compounds are $(C_2H_5)_2AlOAl(C_2H_5)_2$, $(C_4H_9)_2AlOAl(C_4H_9)_2$, and

The organic compounds of metals other than aluminum include diethyl magnesium, ethyl magnesium chloride, diethyl zinc, $LiAl(C_2H_5)_4$, and $LiAl(C_7H_{15})_4$.

The organometallic compound may be used alone or in combination with an electron donor compound which is a carboxylic ester, organosilicon compound, or a compound containing a hetero atom such as nitrogen, sulfur, oxygen, and phosphorus.

Examples of the carboxylic esters include butyl formate, ethyl acetate, butyl butyrate, isobutyl isobutyrate, propyl pivalate, isobutyl pivalate, ethyl acrylate, methyl methacrylate, ethyl methacrylate, isobutyl methacrylate, diethyl malonate, diisobutyl malonate, diethyl succinate, dibutyl succinate, diisobutyl succinate, diethyl glutarate, dibutyl glutarate, diisobutyl glutarate, diiosbutyl adipate, dibutyl sebacate, diisobutyl sebacate, diethyl maleate, dibutyl maleate, diisobutyl maleate, monomethyl fumarate, diethyl fumarate, diisobutyl fumarate, diethyl tartrate, dibutyl tartrate, diisobutyl tartrate, ethyl cyclohexanecarbonate, methyl benzoate, ethyl benzoate, methyl p-toluylate, ethyl p-tertiarybutylbenzoate, ethyl p-anisate, ethyl alpha-naphthoate, isobutyl alpha-naphthoate, ethyl cinnamate, monomethyl phthalate, monobutyl phthalate, dibutyl phthalate, diisobutyl phthalate, dihexyl phthalate, dioctyl phthalate, di-2-ethylhexyl phthalate, diaryl phthalate, diphenyl phthalate, diethyl isophthalate, diisobutyl isophthalate, diethyl terephthalate, dibutyl terephthalate, diethyl naphthalate, and dibutyl naphthalate, triethyl trimellitate, tributyl trimellitate, tetramethyl pyromellitate, tetraethyl pyromellitate, and tetrabutyl pyromellitate.

Examples of the organosilicon compounds include tetramethoxysilane, tetraethoxysilane, tetrabutoxysilane, tetraisobutoxysilane, tetraphenoxysilane, tetra(p-methylphenoxy)silane, tetrabenzyloxysilane, oxysilane, methyltrimethoxysilane, methyltriethoxysilane, methyltributoxysilane, methyltriphenoxysilane, ethyltriethoxysilane, ethyltriisobutoxysilane, ethyltriphenoxysilane, butyltrimethoxysilane, butyltriethoxysilane, butyltributoxysilane, butyltriphenoxysilane, isobutyltriisobutoxysilane, vinyltriethoxy- silane, aryltrimethoxysilane, phenyltrimethoxysilane, phenyltriethoxysilane, benzyltriphenoxysilane, methyltriaryloxysilane, dimethyldimethoxysilane, dimethyldiethoxysilane, dimethyldiisopropoxysilane, dimethyldibutoxysilane, dimethyldihexyloxysilane, dimethyldiphenoxysilane,ddiethyldiethoxysilane, diethyldiisobutoxysilane, diethyldiphenoxysilane, dibutyldiisopropoxysilane, dibutyldibutoxysilane, dibutyldiphenoxysilane, diisobutyldiethoxysilane, diisobutyldiisobutoxysilane, diphenyldimethoxysilane, diphenyldiethoxysilane, diphenyldibutoxysilane, dibenzyldiethoxysilane, divinyldiphenoxysilane, diaryldipropoxysilane, diphenyldiaryloxysilane, methylphenyldimethoxysilane, and chlorophenyldiethoxysilane.

Examples of the electron donor compound containing a hetero atom are given below. Those which contain a nitrogen atom include 2,2,6,6-tetramethylpiperidine, 2,6-dimethylpiperidine, 2,6-diethylpiperidine, 2,6-diisopropylpiperidine, 2,2,5,5-tetramethylpyrrolidine, 2,5-dimethylpyrrolidine, 2,5-diethylpyrrolidine, 2,5-diisopropylpryrrolidine, 2-methylpyridine, 3-methylpyridine, 4-methylpyridine, 1,2,4-trimethylpiperidine, 2,5-dimethylpiperidine, methyl nicotinate, ethyl nicotinate, nicotinamide, benzoic amide, 2-methylpyrrole, 2,5-dimethylpyrrole, imidazole, toluylic amide, benzonitrile, acetonitrile, aniline, paratoluidine, orthotoluidine, metatoluidine, triethylamine, diethylamine, dibutylamine, tetramethylenediamine, and tributylamine. Those which contain a sulfur atom include thiophenol, thiophene, ethyl 2-thiophenecarboxylate, ethyl 3-thiophenecarboxylate, 2-methylthiophene, methylmercaptan, ethylmercaptan, isopropylmercaptan, butyl mercaptan, diethyl thioether, diphenylthioether, methyl benzenesulfonate, methyl sulfite, and ethyl sulfite, Those which contain an oxygen atom include tetrahydrofuran, 2-methyltetrahydrofuran, 3-methyltetrahydrofuran, 2-ethyltetrahydrofuran, dioxane, dimethyl ether, diethyl ether, dibutyl ether, diisoamyl ether, diphenyl ether, anisole, acetophenone, acetone, methyl ethyl ketone, acetyl acetone, ethyl 2-furoate, isoamyl 2-furoate, methyl 2-furoate, and propyl 2-furoate. Those which contain a phosphorus atom include triphenyl phosphine, tributyl phosphine, triphenyl phosphite, tribenzyl phosphite, diethyl phosphate, and diphenyl phosphate.

These electron donor compounds may be used in combination with one another. In addition, these electron donor compounds may be used when the catalyst component is used in combination with an organometallic compound. Alternatively, they may be used after previous contact with an organometallic compound.

The organometallic compound is used in an amount of 1 to 2000 gram-ole, particularly 20 to 500 gram-mol, for 1 gram-atom of titanium in the catalyst component of this invention.

The ratio of the organometallic compound to the electron donor compound is such that one mol of the electron donor compound matches 0.1 to 40 gram-atom, preferably 1 to 25 gram-atom of metal in terms of aluminum in the organometallic compound.

Polymerization of Olefins

The catalyst composed of the catalyst component obtained as mentioned above and an organometallic compound (and an electron donor compound) is useful as a catalyst for homopolymerization of a monoolefin of carbon number 2 to 10 and copolymerization of a monoolefin with another monoolefin or a diolefin of carbon number 3 to 10. It exhibits outstanding performance in homopolymerization of ethylene or random or block copolymerization of ethylene with alpha-olefins of carbon number 3 to 10, such as propylene, 1-butene, 4-methyl-1-pentene, 1-hexene, and 1-octene.

The polymerization may be performed in either gas phase or liquid phase. The liquid phase polymerization may be accomplished in an inert hydrocarbon such as n-butane, isobutane, n-pentane, isopentane, hexane, heptane, octane, cyclohexane, benzene, toluene, and xylene; or in the liquid monomer. The polymerization temperature is usually $-80°$ C. to $+150°$ C., preferably 20° to 120° C. The polymerization pressure is 1 to 60 atm. The molecular weight modification of the resulting polymer is accomplished by the aid of hydrogen or any known molecular weight modifier present in the system. In the case of copolymerization, the quantity of an olefin to be copolymerized is usually less than 30 wt %, particularly 0.3 to 15 wt%, based on the principal olefin. The polymerization with the catalyst system of this invention may be performed continuously or batchwise under the commonly used conditions. The copolymerization may be accomplished in one step or in two or more steps.

Effect of the Invention

The catalyst component of this invention is effective as a component of the catalyst for producing high-density polyethylene and copolymers of ethylene with an alpha-olefin such as propylene, 1-butene, 4-methyl-1-pentene, 1-hexene, and 1-octene.

The polymerization catalyst containing the catalyst component of this invention has a high polymerization activity. In addition, it provides (co)polymers having a high bulk density and a narrow particle size distribution. It provides (co)polymers containing a reduced amount of injurious materials resulting from the catalyst.

EXAMPLES

The invention is illustrated with the following examples and application examples, in which percent (%) is by weight, unless otherwise indicated.

The melt index (MI) of the resulting polymer was measured according to ASTM D1238. The bulk density was measured according to ASTM D1895-69, method A. The true density was measured according to JIS K7112-D that employs specimens prepared according to JIS K6760 and water-isopropanol mixture.

EXAMPLE 1

Contaction of Silicon Dioxide with Magnesium Dimethoxide

In a 200-ml flask equipped with a stirrer, with the air therein replaced with nitrogen, was placed 9.3 g of silicon dioxide ($SiO_2$) [prepared by calcining G-952, a product of Davison Co., having a specific surface area of 302 $m^2/g$, a pore volume of 1.54 $cm^3/g$, and an average pore radius of 204 A, in a nitrogen stream at 200° C. for 2 hours and further at 700° C. for 5 hours] and 16 ml of saturated solution of magnesium dimethoxide in methanol. After stirring at room temperature for 10 minutes, nitrogen gas was blown in with agitation to remove excess methanol by vaporization. The solution of magnesium methoxide was added in the same way as mentioned above to perform the contacting with the solid substance. The resulting solid substance was dried in vacuo at 90° C. for 2 hours.

Contacting with Trichlorosilane

To the solid substance (9.5 g) obtained in the preceding step was added 100 ml of n-heptane and 8.0 ml of trichlorosilane, followed by stirring at 70° C. for 5 hours. The resulting solid substance was washed three times with 100 ml of n-hexane at room temperature, followed by drying under a nitrogen stream and then in vacuo at b 70° C.

Contacting with Titanium Tetrachloride

To the solid substance (9.0 g) obtained in the preceding step was added 100 ml of toluene and 1.5 ml of titanium tetrachloride, followed by stirring at 90° C. for 2 hours. The solid substance was washed three times with 100 ml of n-hexane at room temperature, followed by drying in vacuo at room temperature for 1 hour. Thus there was obtained 8.5 g of catalyst component, which was found to contain 1.64% of magnesium, 0.64% of titanium, and 15.5% of chlorine.

COMPARATIVE EXAMPLE 1

A catalyst component was prepared as in Example 1 except that the contacting with trichlorosilane was not performed. Thus there was obtained a catalyst component, which was found to contain 1.45% of magnesium, 3.03% of titanium, and 7.13% of chlorine.

EXAMPLE 2

The same procedure as in Example 1 was repeated except that trichlorosilane was replaced by methyldichlorosilane. To the resulting solid substance (4.4 g) were added 40 ml of toluene and 0.8 ml of titanium tetrachloride in the same way as in Example 1. Thus there was obtained 4.2 g of catalyst component, which was found to contain 1.72% of magnesium, 0.63% of titanium, and 8.92% of chlorine.

EXAMPLE 3

The contacting of silicon dioxide with magnesium dimethoxide was performed in the same way as in Example 1. To the resulting solid substance (4.9 g) were added 60 ml of n-heptane and 7.0 g of dichlorosilane, followed by stirring at 70° C. for 8 hours. The resulting solid substance was treated in the same manner as in Example 1. The catalyst component thus obtained was found to contain 1.44% of magnesium, 0.49% of titanium, and 11.3% of chlorine.

EXAMPLE 4

A catalyst component was prepared as in Example 1 except that trichlorosilane was replaced by dimethylchlorosilane. The catalyst component thus obtained was found to contain 1.79% of magnesium, 0.66% of titanium, and 7.94% of chlorine.

APPLICATION EXAMPLE 1

Copolymerization of Ethylene with 1-butene

In a 1.5-liter autoclave (made of stainless steel SUS-316) equipped with a stirrer were placed 700 ml of isobutane, 0.7 mmol of triisobutyl aluminum, and a sealed glass ampoule containing 26.6 mg of the catalyst component prepared in Example 1. The reaction system was heated to 80° C. Hydrogen was introduced until the partial pressure of hydrogen reached 1.5 $kg/cm^2$, and then ethylene was introduced until the partial pressure of ethylene reached 5 $kg/cm^2$. As soon as the glass ampoule was broken by rotating the stirrer and the stirring was started, 30 g of 1-butene was forced into the autoclave. Polymerization was performed for 2 hours by continuously supplying ethylene so that the total pressure was kept constant in the polymerization system.

After the polyerization was complete, unreacted ethylene and 1-butene and isobutane were purged. The resulting white polymer powder was dried in vacuo at 70° C. for 10 hours. There was obtained 90.0 g of white ethylene-1-butene copolymer having an MI of 0.25 g/10 min, a bulk density of 0.39 $g/cm^3$, and a true density of 0.9301 g/cc. The specific catalytic activity was as follows: Ec=338 g/g-catalyst component$^{•hr•}$ ethylene partial pressure Et=52.7 kg/g-Ti$^{•hr•}$ ethylene partial pressure.

APPLICATION EXAMPLES 2 TO 5

Copolymerization of ethylene with 1-butene was carried out in the same manner as in Application Example 1 except that the catalyst components obtained in Examples 2 to 4 and Comparative Example 1 were used. The results are shown in Table 1.

APPLICATION EXAMPLE 6

Polymerization of Ethylene

Polymerization of ethylene was performed in the same manner as in Application Example 1 except that the amount of the catalyst component obtained in Example 1 was changed to 61.0 mg, the partial pressure of hydrogen was changed to 2.0 $kg/cm^2$, and 1-butene was not used. There was obtained 48.4 g of polyethylene powder having a bulk density of 0.39 g/cc and an MI of 0.15 g/10 min.

(Ec=79.4 g/g•cat•hr•atm., Et=12.4 kg/g•Ti•hr•atm.)

APPLICATION EXAMPLE 7

Polymerization of ethylene was performed in the same manner as in Application Example 6 except that the catalyst component obtained in Comparative Example 1 was used. There was obtained polyethylene powder having a bulk density of 0.39 g/cc and an MI of 0.11 g/10 min.

(Ec=59.4 g/g·cat·hr·atm., Et=1.8 kg/g·Ti·hr·atm.)

TABLE 1

| Application Example | Catalyst component | Ec* | Et** | Bulk density (g/cc) | MI (g/10 min) | True density (g/cc) |
|---|---|---|---|---|---|---|
| 1 | Example 1 | 338 | 52.7 | 0.39 | 0.25 | 0.9301 |
| 2 | Example 2 | 259 | 41.1 | 0.38 | 0.34 | 0.9258 |
| 3 | Example 3 | 247 | 50.5 | 0.38 | 0.29 | 0.9288 |
| 4 | Example 4 | 236 | 35.6 | 0.39 | 0.51 | 0.9294 |
| 5 | Comparative Example 1 | 151 | 5.0 | 0.30 | 0.15 | 0.9284 |

*g/g-cat · hr · atm
**kg/g-Ti · hr · atm

What is claimed is:

1. An ethylene polymerization process comprising the polymerization of ethylene or the copolymerization of ethylene with an alpha-olefin in the presence of a catalyst system comprising:
   (A) a titanium containing catalyst component obtained by contacting (a) a metal oxide of a metal selected from Groups II to IV of the Periodic Table and (b) a magnesium dihydrocarybyloxide, contacting the contact product therefrom with (c) a halogen-containing compound selected from $SiCl_4$, $SnCl_4$, $AlCl_3$, $BCl_3$, $SbCl_3$, $BI_3$, $PCl_3$, $PCl_5$, hydrogen halides, oxyhalides of S, N, and P, halogenated hydrocarbons and halohydrosilanes, and contacting the contact therefrom with (d) a titanium compound,
   (B) a cocatalyst selected from organometallic compounds of metals of Groups I and III.

2. A process in accordance with claim 1 wherein the organometallic compound is selected from organoaluminum compounds represented by the formula $R''_n AlX_{3-n}$ wherein $1 \leq n \leq 3$, $R''$ is an alkyl or aryl group having from 1 to 18 carbon atoms and X is a halogen atom.

3. A process in accordance with claim 1 wherein the (a) metal oxide is selected from $B_2O_3$, $MgO$, $Al_2O_3$, $SiO_2$, $CaO$, $TiO_2$, $ZnO$, $ZrO_2$, $SnO_2$, $BaO$, $ThO_2$, and mixtures thereof the (b) magnesium hydrocarbyloxide is selected from solvent soluble magnesium dihydrocarbyloxides, the (c) halogen compound is selected from silanes represented by the formula $H_m$ wherein $R_n$ is selected from hydrocarbyl groups, $R^1O—$, $R^2R^3N—$, and $R^4COO—$ wherein $R^1$, $R^2$, and $R^3$ are hydrocarbyl groups and $R^4$ is a hydrogen atom or a hydrocarbyl group, the hydrocarbyl groups being selected from $C_1$-$C_{16}$ alkyl, alkenyl, cycloalkyl, aryl, and aralkyl groups, X is a halogen atom, m is a positive integer of 1 to 3, $0<r<4$ and $m+n+r=4$ and the titanium compound is represented by the formula $TiX_p(OR)_{4-p}$ wherein $0<p<4$, X is a halogen and R is an alkyl or aryl group having from 1 to 10 carbon atoms.

4. A process in accordance with claim 3 wherein the (a) metal oxide is $SiO_2$, the (b) magnesium dihydrocarbyloxide is selected from hydrocarbon or halogenated hydrocarbon soluble magnesium hydrocarbyloxides wherein the hydrocarbyl is an alkyl group or cycloalkyl group having 7 to 10 carbon atoms, and alcohol soluble magnesium hydrocarbyloxides wherein the hydrocarbyl groups are selected from alkyl, cycloalkyl, and aryl groups having from 1 to 10 carbon atoms, the (c) silane is selected from trichlorosilane, dichlorosilane, methyldichlorosilane, and dimethylchlorosilane, and the (d) titanium compound is titanium tetrachloride.

5. A process in accordance with claim 4 wherein the magnesium hydrocarbyloxide is selected from magnesium di-2-ethylhexyloxide, magnesium di-1-methylhexyloxide, magnesium di-1-ethylpentyloxide, magnesium di-1-methylhexyloxide, magnesium di-1-ethyhexyloxide, magnesium dimethoxide, magnesium diethoxide, magnesiummethoxide ethoxide, $Mg(Oi-C_3H_7)_2$, $Mg(OC_3H_7)_2$, $Mg(OH_4H_9)_2$, $Mg(O-iC_4H_9)_2$, $Mg(OC_4H_9)(Oi-C_4H_9)$, $Mg(OC_4H_9)(Osec-C_4H_9)$, $Mg(OC_6H_{13})_2$, $Mg(OC_6H_{11})_2$, and $Mg(OC_6H_5)_2$, the (c) silane is trichlorosilane.

* * * * *